Dec. 17, 1935.  H. BUEL  2,024,206
ROLLER BEARING
Filed June 15, 1933  3 Sheets-Sheet 1

INVENTOR

ATTORNEY

Dec. 17, 1935.     H. BUEL     2,024,206

ROLLER BEARING

Filed June 15, 1933     3 Sheets-Sheet 3

INVENTOR

ATTORNEY

Patented Dec. 17, 1935

2,024,206

UNITED STATES PATENT OFFICE 2,024,206

ROLLER BEARING

Hillhouse Buel, Orange, N. J.

Application June 15, 1933, Serial No. 675,957

7 Claims. (Cl. 308—214)

This invention relates particularly to tapered roller bearings. It has for its principal objects to provide a fully free-rolling bearing; to provide a bearing that may be safely preloaded to any desirable preloading pressure; to provide a filled-race bearing, eliminating the cage ordinarily employed; to provide for assembly on the outer race member; and to provide a third race located on the cup or outer member to function as a shoulder-race for the shoulders of the rollers, which is substantially, for practical purposes, free from friction.

With these and other objects in view this invention consists of a three-race tapered roller-bearing; there being a race on the inner member or cone, and a race on the outer member or cup, these two races being conical and complementary, and a race on a flange which projects inwardly from the larger end of the outer member, upon which roll the shoulders of the larger ends of the rollers. This shoulder-race as nearly as it is practical to make it, is a true race, and not a rubbing or friction contact. The elements of the bearings are so disposed that when the bearing is installed and in operation no parts of the rollers other than the shoulder edges contact with the inwardly projecting flange. Means are also provided to retain the rollers on the outer member when the inner member is not seated within the circle of the rollers.

The bearing is preferably of the filled-race type, in which type the space between the inner and the outer members is substantially filled with the tapered rollers, while permitting them to roll freely. The invention is not limited, however, to the filled-race type. In a non-filled-race type a cage will be provided of well-known form adapted to assembly on the outer race.

All important details of construction will appear from the specification and drawings.

In the accompanying three sheets of drawings.

Figure 1:
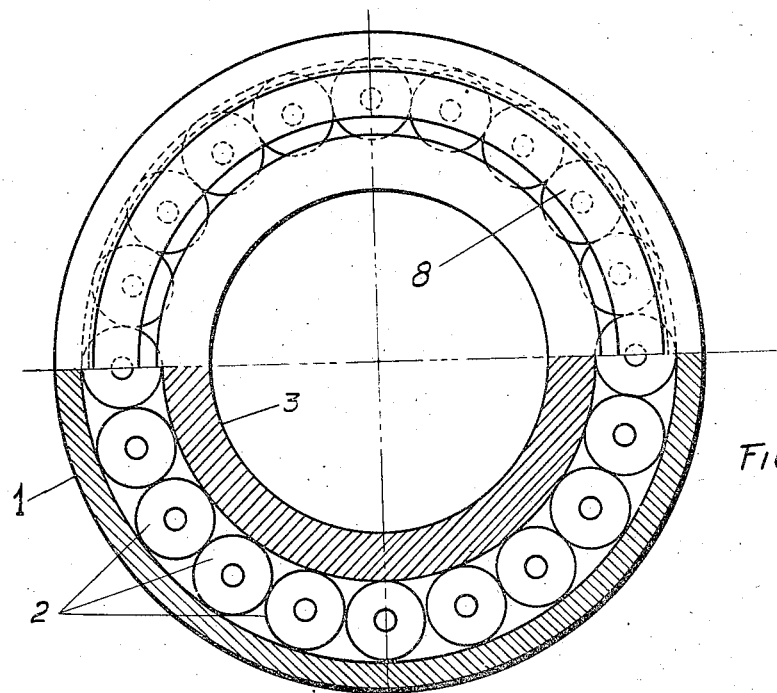
Figure 1 shows a roller bearing embodying this invention, the lower half being in section on the plane I—I of Fig. 2, and the upper half being in elevation and showing the larger ends of the rollers.
Figure 2:
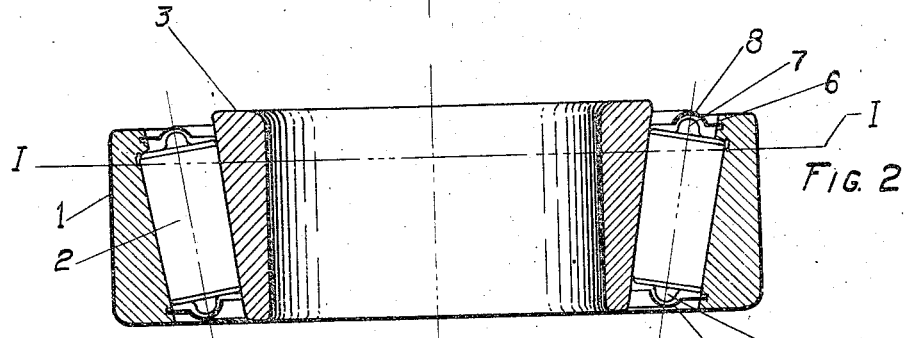
Figure 2 is a section through the axis of the bearing showing in elevation the rollers with the inner and outer race members and the third race on an inwardly disposed flange on the outer member, and showing retaining rings seated in grooves in the cup or outer race member and extending over retaining pins on the ends of the rollers.

In the drawings 1 is the outer race member or cup; 2 are tapered rollers, and 3 is the inner race member or cone. It will be observed that the inner member is free from flanges, ribs or other departure from a straight cone. 4 is a slightly rounded shoulder at the larger end of the tapered rollers. This shoulder bears at 5 on a shoulder-race surface on the flange 6 of the outer member, the face of which makes an angle with the head of the roller, so as to secure substantially, for practical purposes, a point contact of the roller on the shoulder race. Conical surface $a$—$a$ on the outer member has identical pitch with the surfaces of the rollers when and where their peripheral surfaces contact with the outer race surface. Conical surface $d$—$d$ on the inner member has identical pitch with the surfaces of the rollers when and where their peripheral surfaces contact with the inner race surface.

In such a structure the thrust load is delivered to the rollers by the inner member in a line perpendicular to $d$—$d$ and is opposed by the outer race member in a line perpendicular to $a$—$a$. Between these perpendiculars there is a slight angle determined by the taper of the rollers. From this angle between the two perpendiculars there results a creep load the direction of which $b$—$b$ is parallel to the line $a$—$a$ and toward the larger end of the rollers and nearly opposite to the direction of the primary thrust load exerted on the inner member. This back creep load is borne by the shoulder race indicated by the line $s$—$s$ on flange 6 of the outer member 1. Theoretically, the surface of the shoulder race $s$—$s$ would be disposed at an angle substantially perpendicular to the direction of the back creep load, with a small allowance for advantageous shoulder contact, 9° on either side of the perpendicular being the critical angle of slippage of smooth surfaces. The theoretical angle is not attainable in shop practice, but it should be borne in mind that with any departure from a right angle the heads of the rollers tend to move up or down on the shoulder race. Under 90° the effect is objectionable.

Above 90°, depending on the thrust load, the range may be effectively varied up to 105° and with very light loads perhaps a few degrees higher. Under 94° the angle is impracticable in ordinary shop practice because of inordinate cost and not so good for shoulder contacts. Angles of 95° or 96°, though fair for shoulder contact, would entail added production cost, which would prove prohibitive in highly competitive fields.

But I have discovered that angles from 97° to 102° will assure the best obtainable results and most practical shoulder contact for most bearing problems. Within this range the most effective roller action between the shoulder race and the shoulders of the rollers is assured, and the shop practice is simplified to an extent that the bearings may be produced in types and for uses that are highly competitive. In any event the range is greatly restricted and its limits are technically and mechanically important.

Obviously if a shoulder race were given an angle of 90° or less to the outer race, it would hit too high on the ends of the rollers and cause an appreciable amount of friction. This, in turn, would tend to cause a drag on the contacting ends of the rollers, resulting in appreciable disalignment of the rollers. This effect would be great enough to necessitate a sturdy cage to offset, so much as such means would make possible, the tendency of the drag to cause disalignment.

Naturally these and other objectionable effects would occur and be greatly augmented were such a race or flange located on the inner race or cone, though at moderate speeds and loads with a good cage, alignment might be reasonably well maintained.

It will be understood by those familiar with the art, that the use of a cage precludes the idea of a filled race. A structure to provide a filled race must, therefore, be without a cage.

But in order to eliminate the cage, so as to make a filled race possible and at the same time mechanically safe and efficient for all speeds and loads, it is essential to provide a structure, which will cause no appreciable friction or drag on the ends of the rollers.

This structure is provided and these essential requirements attained in this invention by locating a shoulder race at the larger end of the outer race member or cup and giving to that shoulder race the required pitch angle as indicated in this specification, and by grinding the shoulders of the rollers to a radius as required by the size, use and other mechanical and operating factors of the bearing.

It will be observed that, due to limitations arising in part from shop practice, even a pitch of 94° or even of 95° or 96°, given to a shoulder race would not safely assure a proper rolling surface for the radius ground shoulders of the rollers. Also, except under light loads and low speeds, angles in excess of 105° would produce undesirable results, due to improper distribution of forces.

Obviously, therefore, in an efficient filled race tapered roller bearing, it is mechanically essential to provide a structure, in which a shoulder race, restricted to a pitch within the range specified in this invention, shall be located on the outer race member, in order to prevent appreciable friction and drag on the heads of the rollers, improper distribution of forces and to preserve proper alignment of the rollers under all operating conditions, including high speeds and heavy radial and thrust loads. The structure as described in this specification will assure free rolling for all parts of such a bearing and maintain alignment.

The radius of the curvature of the shoulder 4 on the rollers 2 should preferably be such that the tangent at the point of rolling contact in line c—c will coincide with the angle which the shoulder race S—S makes with the surface a—a. The most effective relationship is sought between the radius of the shoulder of the rollers, the points of contact with the shoulder race and the radial planes of the bearing through the points of tangency of the rollers on the outer race surface.

There are retaining pins 7 at each end of the rollers which function with the retaining rings 8 fitted into grooves in the outer member at either end of the rollers. The retaining rings which are provided for assembly are so shaped that they cannot touch the rollers at any point when the bearing is installed and in operation, but when the inner race member is removed they function with the pins 7 to retain the rollers in assembly on the outer race member. A groove recess 9 is provided in accordance with shop practice.

The structure of the free-rolling bearing herein described eliminates all friction on the heads of the rollers and assures perfect frictionless free-rolling under all conditions of thrust over-loads and any preloading required. This is for the reason that the only contact of the rollers in this bearing with the shoulder or flange 6 at the larger end of the outer member 1 is in the line b—b parallel to the surface a—a, and in the line c—c which is normal to the tangent of the shoulder 4 where these lines b—b and c—c intersect and contact with the shoulder race S—S at the point 5. For all practical purposes this is only a point contact of a rolling body on a race surface, as would be disclosed by the cycloidal curve of the points on the shoulder 4 of a roller 2 rolling between the inner and outer race members 1 and 3.

With the free-rolling bearing herein described the load, whether a thrust over-load or a preloading pressure is, as stated above, delivered directly to the sides of the rollers. In ordinary practice very little of such loads (possibly not more than five per cent) would fall on the shoulders of the rollers 4 and the shoulder-race as a back creep load and this in a free-rolling action and hence free from friction; and this would be distributed over the shoulders of all the rollers in the bearing. For instance, if there are twenty rollers in a filled race, the portion of such thrust over-load or preloading pressure that would fall on the shoulder of any one roller, would not exceed one-fourth of one per cent, which is negligible. In the present insistent demand of machine tool manufacturers for bearings that can be preloaded, this feature of a shoulder race on the outer member which assures free rolling, is extremely important for high speed spindles, motors and wherever maximum flexibility with entire freedom from looseness, play or chatter is essential or required.

Figure 3:
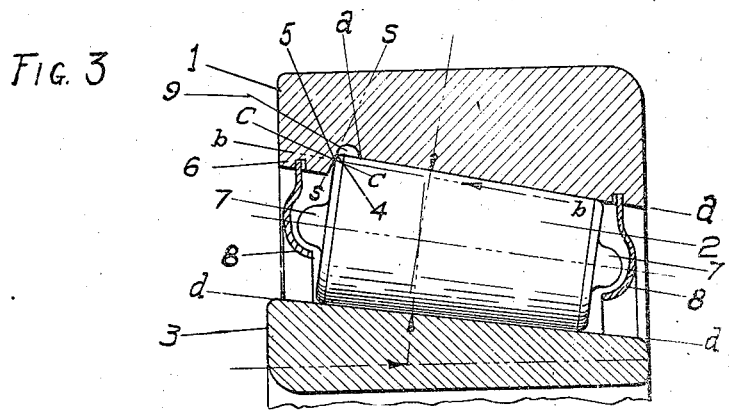
Figure 3 is an enlarged section of a portion of the bearing as illustrated in Fig. 2, the roller being shown in elevation.

Referring to Fig. 3 for illustration, a tapered roller bearing can take care of a thrust load only if it presses from left to right on the cone 3 or from right to left on the cup 1. If the thrust be reversed it will tend to open up the bearing. It follows that the shoulder race S—S in Figure 3 does not take the thrust load, which all comes on the sides of the rollers and the supporting races. The shoulder race operates only to take care of the back-creep load, a load different in type and elements of time, and which is opposite in direction and much smaller than the thrust load. The roller moves against the race S—S and never the race against the roller. The race S—S is therefore not a thrust flange but is a true race.

Were a shoulder race or flange located on the cone it would necessarily be located on the larger end in order to function. In this position the full burden of the first impact of any thrust overload would come on the flange and the heads of the rollers though it might ultimately be distributed to the sides of the rollers and supporting races.

The importance of the difference in load distribution set forth may be illustrated by a numerical example.

The mathematical expression for the back-creep load which comes on the shoulder race S—S located as herein shown and described is $$L \div \frac{\cos \theta}{\sin \theta}$$

where $L$ is the thrust load and $\theta$ is the angle between the perpendiculars to the lines $d$—$d$ and $a$—$a$ of Figure 3. Assuming a value for $\theta$ of 2° 39″ 22″, which is substantially a standard taper, $$\cos \theta \div \sin \theta = 21.6055.$$

Assuming a thrust load of 1000 pounds, the total back-creep load would be 46.2844 lbs. With say twenty rollers the load on any one roller would be 2.312 lbs., which is negligible in practice.

If the shoulder race or flange were on the cone the entire thrust load of 1000 pounds would come directly on the race or flange, and distributed over the heads of twenty rollers would be 50 pounds per roller. This is a difference of over 20 to 1 or 2000%.

Moreover, with high speed spindles, sometimes running to tens of thousands of R. P. M. a flange or race on the cone would impart a terrific impact to the heads of the rollers, with a consequent great tendency to knock them out of alignment. This tendency is entirely absent from the bearing of this invention with a true shoulder race located at the larger end of the cup.

Figure 4:
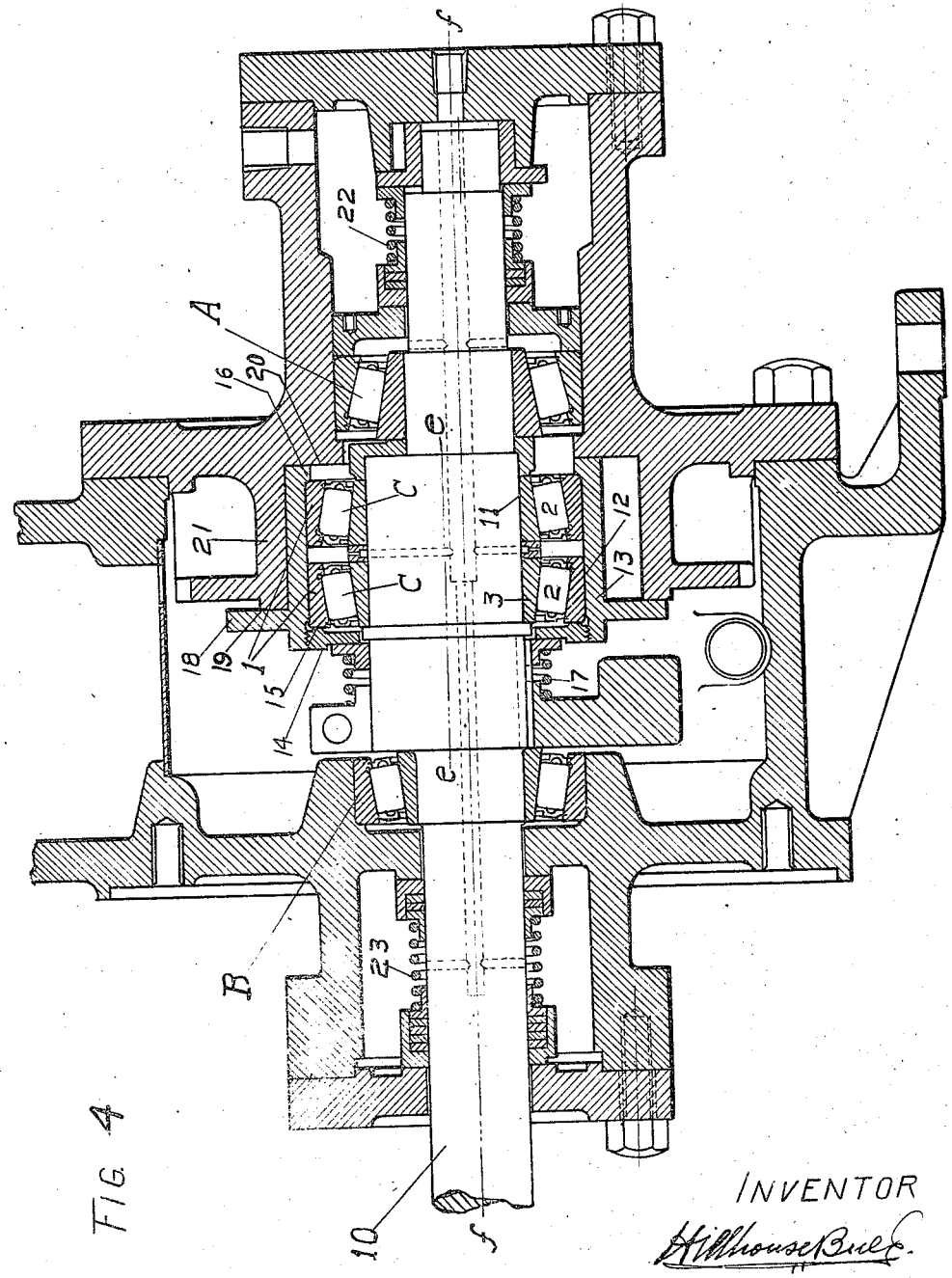
Figure 4 is an axial section of a compressor unit showing the use of roller bearings embodying this invention in a rotor compressor.
Figure 5:
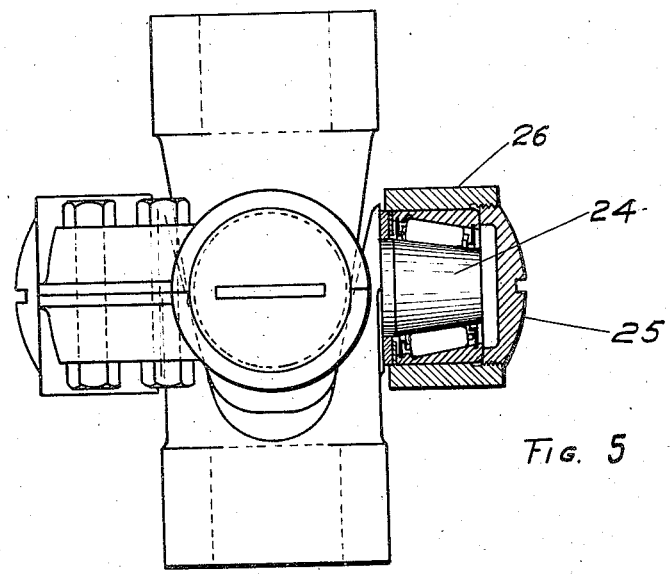
Figure 5 is an axial elevation of a universal-couple joint, embodying this invention, one trunnion arm being shown in section on a plane L—L of Fig. 6.
Figure 6:
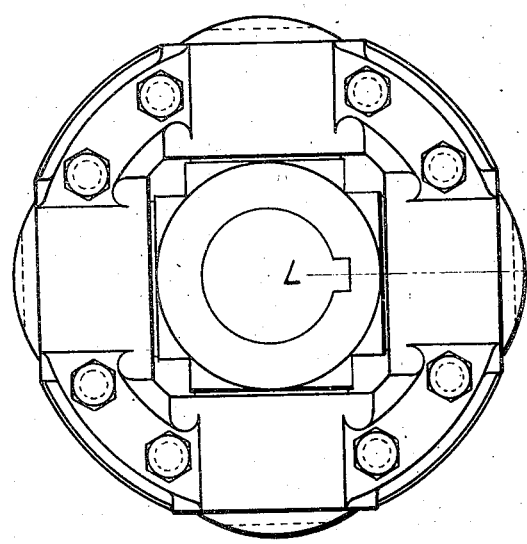
Figure 6 is an elevation of the universal-couple joint of Fig. 5 showing the housing.

Figs. 4, 5 and 6 exemplify a use of my free-rolling bearing where great flexibility, with preloading, fine adjustment and high speeds are required, and friction and heating must be eliminated.

Fig. 4 shows a double application of this bearing to the shaft and compressor element respectively of a compressor. Bearings A and B function as spindle or shaft bearings to be rated at speeds dependent on the size and use of the compressor, and are required to absorb all thrust and radial loads and prevent any axial movement of the shaft 10 along the axis of rotation $f$—$f$. The shaft carries a compressor unit G with an axis $e$—$e$ and cylindrical surface 11 upon which are mounted the inner race member 3 of the free-rolling double tapered roller bearing C with rollers 2 and outer race members 1. These outer race members are given a snug fit to the surface 12 of the rotor compressor element 13 by the adjusting screw 14 which is screwed against the adjacent outer-race member 1 at point 15. The companion race member 1 is held by the shoulder of the flange 16 of the rotor 13. Screw 14 thereby functions as an adjustable preloading means. Spring 17 maintains the flanges 18 and 16 in contact with the ends 19 and 20 of the cylinder 21. Spring 22 acts as a yielding member to hold bearings A and B in their preloaded adjustment, and with spring 23 provides for any shaft expansion that might occur.

When the shaft is rotated the inner race member (3) rolls on rollers 2 which roll on outer race member 1, held tight to rotor 13, causing the outer surface of the rotor to roll on the inner surface of the cylinder 21 of greater diameter than the rotor, thus causing the entrapped gas to be compressed at each revolution of the shaft.

Figs. 5 and 6 show an application of this free-rolling bearing to a universal couple-joint to rotate at high speed. This use calls for a preloading bearing on a couple-element which is to rotate at high speeds, which will have no loose play and will possess great flexibility. A taper is requisite to maintain preloading conditions. Friction would reduce the flexibility of this element and would cause it to stick and freeze. A frictional element of any kind would be very stiff under preloading and would throw an excessively high torque on the shaft and connections. The rollers are not called upon to roll much but with this free-rolling bearing the slightest rolling or movement makes sticking impossible and flexibility perfect. The ease of preloading and freedom from all friction on the shoulder-race make it possible to prevent all looseness in the units without detracting from perfect flexibility and freedom from stiffness. In this unit the tapered trunnion 24 performs the function of the inner race member and the screw head 25 screwed into the boxing 26 provides readily and simply for preloading adjustment.

I have shown the shoulder race as formed upon a flange which is integral with the cup but obviously it could be formed as a separate ring attached to the cup. Other changes may be made without departing from this invention.

Without limiting myself to details shown and described, I claim:

1. A triple-race, filled-race, free-rolling tapered roller bearing, having a conical race on the outer member and a conical race on the inner member and a third race located on a shoulder extending inwardly from the outer member of the bearing, the third race being at an obtuse angle, ranging from 91° to 105°, to the conical race surface of the outer member and also at an angle to the surfaces of the larger ends of the rollers, and so positioned and disposed that the rounded shoulder edges of the larger ends of the rollers may roll freely on the third race and that no other part of the rollers can contact therewith when the bearing is installed and in operation, provision whereby the space between the inner and outer members may be substantially filled with tapered rollers while permitting the rollers to roll freely, and means to retain the rollers on the outer member when the inner member is not seated within the circle of rollers.

2. A triple-race, filled-race, free-rolling tapered roller bearing, having a conical race on the outer member and a conical race on the inner member, the inner member being conical throughout, and a third race located on a shoulder extending inwardly from the outer member of the bearing, the third race being at an obtuse angle, ranging from 91° to 105°, to the conical race surface of the outer member and being also at an angle to the surfaces of the larger ends of the rollers, and so positioned and disposed that the rounded shoulder edges of the larger ends of the rollers may roll freely on the third race and that no other part of the rollers can contact therewith when the bearing is installed and in operation, provision whereby the space between the inner and outer members may be substantially filled with tapered rollers while permitting the rollers to roll freely, and means to retain the rollers on the outer member when the inner member is not seated within the circle of rollers.

3. A triple-race, free-rolling tapered roller bearing, having a race on the outer member, a race on the inner member and a third race located on a shoulder which extends inwardly from the outer member of the bearing, the third race being at an obtuse angle ranging between 95° and 105° to the inner conical surface of the outer member and being also at an angle to the end surfaces of the larger ends of the rollers and so positioned and disposed that the shoulder edges of the larger ends of the rollers may roll on the third race and that no other part of the rollers can contact therewith when the bearing is installed and in operation, the space between the inner and outer races being adapted to receive the inner tapered rollers, with rounded shoulders at their larger ends, and means to retain the rollers on the outer member when the inner member is not seated within the circle of rollers.

4. A triple-race, filled-race, free-rolling tapered roller bearing, having a race on the outer member, a race on the inner member and a third race located on a shoulder which extends inwardly from the outer member of the bearing, the third race being at an obtuse angle ranging from 95° to 105° to the conical race surface of the outer member and also being at an angle to the end surfaces of the larger ends of the rollers and so positioned and disposed that the shoulder edges of the larger ends of the rollers may roll on the third race and that no other part of the rollers can contact therewith when the bearing is installed and in operation, provision whereby the space between the races of the inner and outer members may be substantially filled with tapered rollers with rounded shoulders at their larger ends, the rollers being provided with retaining pins at each end, for assembly purposes only, and a retaining ring at each end of the bearing to hold the rollers on the outer member when the inner member is not seated within the circle of rollers, flanges on the outer circumference of the retaining rings, grooves in the inner walls of the outer member between the races and the ends of such member arranged to receive the flanges of the retaining rings, the retaining ring being so shaped as to extend over the ends of the pins on the ends of the rollers in a manner that will clear the pins when the bearing is installed and in use but will serve to hold the rollers on the outer member when the inner member is not in place.

5. A free-rolling tapered roller bearing, having a race on the outer member which engages the peripheral surfaces of the rollers that roll upon it, an inner race which engages the peripheral surfaces of the rollers that roll upon it, and an end race which engages the rounded shoulder edges of the larger ends of the rollers that roll upon it, which end race is disposed at an obtuse angle preferably between 97° and 102° to the outer race and also at an angle to the ends of the rollers, means to adjust and maintain rolling contact of the shoulders of the rollers at a suitable pressure on the end race, for preloading adjustments, and means to retain the rollers in assembly on the outer race member when the inner race member is removed, but which shall not touch the rollers when the bearing is installed and in operation.

6. A triple-race, free-rolling tapered roller bearing, having a race on the outer member, a race on the inner member, the inner member being conical throughout, and a third race located on a shoulder which extends inwardly from the outer member of the bearing, the third race being at an obtuse angle preferably between 97° and 102° to the inner conical surface of the outer member and being also at an angle to the end surfaces of the larger ends of the rollers and so positioned and disposed that the rounded shoulder edges of the larger ends of the rollers may roll on the third race and that no other part of the rollers can contact therewith when the bearing is installed and in operation, the space between the inner and outer races being adapted to receive tapered rollers, and means to retain the rollers on the outer member when the inner member is not seated within the circle of rollers.

7. A triple-race, filled-race, free-rolling tapered roller bearing having a race on the outer member, a race on the inner member, the inner member being conical throughout, and a third race located on a shoulder which extends inwardly from the outer member, the third race being at an obtuse angle preferably between 97° and 102° to the pitch of the conical race surface of the outer member and being also at an angle to the end surfaces of the larger ends of the rollers and so positioned and disposed that the rounded shoulder edges of the larger ends of the rollers may freely roll on the third race and that no other part of the rollers can contact therewith when the bearing is installed and in operation, provision whereby the space between the races on the inner and outer members is substantially filled with tapered rollers, retaining pins at each end of the rollers for assembly purposes only, means to act with these retaining pins to retain the rollers in assembly on the outer race member when the inner race member is not seated within the circle of rollers, and means to adjust and maintain the shoulders of the rollers in contact with the third race at a suitable pressure for preloading adjustments.

HILLHOUSE BUEL.